(12) United States Patent
Bedros et al.

(10) Patent No.: US 10,911,257 B2
(45) Date of Patent: Feb. 2, 2021

(54) CONTEXT-AWARE SMART HOME ENERGY MANAGER

(71) Applicant: Ademco Inc., Golden Valley, MN (US)

(72) Inventors: Saad J. Bedros, West St. Paul, MN (US); Tom Markham, Fridley, MN (US); Tom Plocher, Hugo, MN (US); Pradeep Shetty, Bangalore (IN); Thirumaran Ekambaram, Bangalore (IN); Nasir Mohammed, Woodbury, MN (US)

(73) Assignee: Ademco Inc., Golden Valley, MN (US)

( * ) Notice: Subject to any disclaimer, the term of this patent is extended or adjusted under 35 U.S.C. 154(b) by 403 days.

(21) Appl. No.: 15/166,139

(22) Filed: May 26, 2016

(65) Prior Publication Data

US 2016/0277207 A1 Sep. 22, 2016

Related U.S. Application Data

(63) Continuation of application No. 12/852,690, filed on Aug. 9, 2010, now abandoned.
(Continued)

(51) Int. Cl.
*H04L 12/28* (2006.01)
*G05B 15/02* (2006.01)
*G05B 19/042* (2006.01)

(52) U.S. Cl.
CPC .......... *H04L 12/2829* (2013.01); *G05B 15/02* (2013.01); *G05B 19/0421* (2013.01);
(Continued)

(58) Field of Classification Search
CPC .................................................. H04L 12/2829
See application file for complete search history.

(56) References Cited

U.S. PATENT DOCUMENTS

| 4,079,366 A | 3/1978 | Wong |
| 4,174,807 A | 11/1979 | Smith et al. |

(Continued)

FOREIGN PATENT DOCUMENTS

| DE | 3334117 A1 | 4/1985 |
| EP | 0434926 | 7/1991 |

(Continued)

OTHER PUBLICATIONS

"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.

(Continued)

*Primary Examiner* — Tejal Gami
(74) *Attorney, Agent, or Firm* — Shumaker & Sieffert, P.A.

(57) ABSTRACT

A context-aware smart home energy management (CASHEM) system and method is disclosed. CASHEM dynamically schedules household energy use to reduce energy consumption by identifying contextual information within said household, selecting a comfort of service preference, wherein said comfort of service preference is based on different said contextual information, and extracting an appliance use schedule for maximum energy savings based on said contextual information in light of said comfort of service preferences, by executing a program instruction in a data processing apparatus. CASHEM correlates said contextual information with energy consumption levels to dynamically schedule said appliance based on an energy-saving condition and a user's comfort. Comfort of service preferences are gathered by CASHEM by monitoring occupant activity levels and use of said appliance. CASHEM can (Continued)

also recommend potential energy savings for a user to modify comfort of service preferences.

20 Claims, 7 Drawing Sheets

Related U.S. Application Data (60) Provisional application No. 61/234,947, filed on Aug. 18, 2009.

(52) U.S. Cl.
CPC ........ *H04L 12/282* (2013.01); *H04L 12/2809* (2013.01); *G05B 2219/2639* (2013.01); *G05B 2219/2642* (2013.01); *H04L 2012/285* (2013.01)

(56) References Cited

U.S. PATENT DOCUMENTS

| | | |
|---|---|---|
| 4,206,872 A | 6/1980 | Levine |
| 4,224,615 A | 9/1980 | Penz |
| 4,264,034 A | 4/1981 | Hyltin et al. |
| 4,298,946 A | 11/1981 | Hartsell |
| 4,308,991 A | 1/1982 | Peinetti et al. |
| 4,337,822 A | 7/1982 | Hyltin et al. |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,506,827 A | 3/1985 | Jamieson et al. |
| 4,606,401 A | 8/1986 | Levine et al. |
| 4,621,336 A | 11/1986 | Brown |
| 4,622,544 A | 11/1986 | Bially et al. |
| 4,717,333 A | 1/1988 | Carignan |
| 4,725,001 A | 2/1988 | Carney et al. |
| 4,819,714 A | 4/1989 | Otsuka et al. |
| 4,837,731 A | 6/1989 | Levine et al. |
| 4,881,686 A | 11/1989 | Mehta |
| 4,918,439 A | 4/1990 | Wozniak et al. |
| 4,948,040 A | 8/1990 | Kobayahi et al. |
| 4,992,779 A | 2/1991 | Sugino et al. |
| 4,997,029 A | 3/1991 | Otsuka et al. |
| 4,998,024 A | 3/1991 | Kirk et al. |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 1/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,329,991 A | 7/1994 | Mehta et al. |
| 5,348,078 A | 9/1994 | Dushane et al. |
| 5,386,577 A | 1/1995 | Zenda |
| 5,482,209 A | 1/1996 | Cochran et al. |
| 5,526,422 A | 6/1996 | Keen |
| 5,537,106 A | 7/1996 | Mitsuhashi |
| 5,544,036 A | 8/1996 | Brown, Jr. et al. |
| 5,566,879 A | 10/1996 | Longtin |
| 5,570,837 A | 11/1996 | Brown et al. |
| 5,673,850 A | 10/1997 | Uptegraph |
| 5,682,206 A | 10/1997 | Wehmeyer et al. |
| 5,761,083 A | 6/1998 | Brown et al. |
| 5,782,296 A | 7/1998 | Mehta |
| 5,818,428 A | 10/1998 | Eisenbrandt et al. |
| 5,873,519 A | 2/1999 | Beilfuss |
| 5,877,957 A | 3/1999 | Bennett |
| 5,886,697 A | 3/1999 | Naughton et al. |
| 5,901,183 A | 5/1999 | Garin et al. |
| 5,902,183 A | 5/1999 | D'Souza |
| 5,937,942 A | 8/1999 | Bias et al. |
| 5,947,372 A | 9/1999 | Tiernan |
| 5,950,709 A | 9/1999 | Krueger et al. |
| 5,982,445 A | 11/1999 | Eyer et al. |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,121,875 A | 9/2000 | Hamm et al. |
| 6,140,987 A | 10/2000 | Stein et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,236,326 B1 | 5/2001 | Murphy |
| 6,259,074 B1 | 7/2001 | Brunner et al. |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,453,687 B2 | 9/2002 | Sharood et al. |
| 6,478,233 B1 | 11/2002 | Shah |
| 6,493,603 B1 | 12/2002 | Haeberli |
| 6,493,643 B1 | 12/2002 | Aisa |
| 6,502,758 B2 | 1/2003 | Cottrell |
| 6,518,957 B1 | 2/2003 | Lehtinen et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,619,555 B2 | 9/2003 | Rosen |
| 6,621,507 B1 | 9/2003 | Shah |
| 6,783,079 B2 | 8/2004 | Carey et al. |
| 6,786,421 B2 | 9/2004 | Rosen |
| 6,789,739 B2 | 9/2004 | Rosen |
| 6,824,069 B2 | 11/2004 | Rosen |
| 6,833,990 B2 | 12/2004 | LaCroix et al. |
| 6,851,621 B1 | 2/2005 | Wacker et al. |
| 6,891,838 B1 | 5/2005 | Petite et al. |
| 6,967,565 B2 | 11/2005 | Lingemann |
| 7,001,495 B2 | 2/2006 | Essalik et al. |
| 7,050,026 B1 | 5/2006 | Rosen |
| 7,110,832 B2 | 9/2006 | Ghent |
| 7,146,253 B2 | 12/2006 | Hoog et al. |
| 7,152,806 B1 | 12/2006 | Rosen |
| 7,156,318 B1 | 1/2007 | Rosen |
| 7,181,317 B2 | 2/2007 | Amundson et al. |
| 7,240,289 B2 | 7/2007 | Naughton et al. |
| 7,246,087 B2 | 7/2007 | Ruppelt et al. |
| 7,302,642 B2 | 11/2007 | Smith et al. |
| 7,516,106 B2 | 4/2009 | Ehlers et al. |
| 7,604,046 B2 | 10/2009 | Bergman et al. |
| 7,634,504 B2 | 12/2009 | Amundson |
| 7,693,809 B2 | 4/2010 | Gray |
| 7,706,923 B2 | 4/2010 | Amundson et al. |
| 7,778,734 B2 | 8/2010 | Oswald et al. |
| 7,928,839 B2 | 4/2011 | Chambers et al. |
| 8,063,775 B2 | 11/2011 | Reed |
| 8,160,752 B2 | 4/2012 | Weaver et al. |
| 8,170,720 B2 | 5/2012 | Amundson et al. |
| 8,183,995 B2 | 5/2012 | Wang |
| 8,219,251 B2 | 7/2012 | Amundson et al. |
| 8,219,258 B1 | 7/2012 | Amundson et al. |
| 8,793,021 B2 | 7/2014 | Watson et al. |
| 2001/0029585 A1 | 10/2001 | Simon et al. |
| 2001/0052459 A1 | 12/2001 | Essalik et al. |
| 2002/0022991 A1 | 2/2002 | Sharood et al. |
| 2002/0092779 A1 | 7/2002 | Essalik et al. |

(56) References Cited

U.S. PATENT DOCUMENTS

| | | | |
|---|---|---|---|
| 2002/0107716 A1* | 8/2002 | Callahan | G06Q 10/06311 705/7.21 |
| 2003/0009265 A1 | 1/2003 | Edwin | |
| 2003/0034897 A1 | 2/2003 | Shamoon et al. | |
| 2003/0034898 A1 | 2/2003 | Shamoon et al. | |
| 2004/0117330 A1* | 6/2004 | Ehlers | G06Q 10/10 705/412 |
| 2007/0045441 A1 | 3/2007 | Ashworth et al. | |
| 2008/0272934 A1* | 11/2008 | Wang | G08B 25/10 340/870.11 |
| 2008/0277486 A1 | 11/2008 | Seem et al. | |
| 2011/0046805 A1 | 2/2011 | Bedros et al. | |
| 2012/0239203 A1 | 9/2012 | Amundson et al. | |

FOREIGN PATENT DOCUMENTS

| | | |
|---|---|---|
| EP | 0678204 B1 | 3/2000 |
| EP | 0985994 | 3/2000 |
| EP | 1074009 | 2/2001 |
| SI | 20556 | 10/2001 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |
| WO | WO 01/93779 | 12/2001 |

OTHER PUBLICATIONS

"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-Tech Options Take Hold in New Homes-200-08-28-Dallas Business Journal," http://bizjournals.com/dallas/stories/2000/08/28/focus4, 3 pages, dated Aug. 28, 2008, printed Aug. 19, 2004.
"Home Toys Review—TouchLinc," http://www.hometoys.com/htinews/aug99/reviews/touchlinc.htm, 3 pages, dated Aug. 1999, printed Aug. 20, 2004.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review-Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control Your Heating and Cooling System with Pronto (1/1)," http://www.remotecentral.com/cgi-bin/mboard/rc-x10/thread.cgi?12, 2 pages, dated Apr. 23, 1999, printed Aug. 20, 2004.
"Spotlight on Integrated Systems," Custom Builder, V8, N2, p. 66(6), Mar.-Apr. 1993.
"Vantage Expands Controls for Audio/Video, HVAC and Security," http://www.Hometoys.com/htinews/aug99/realease/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
ADT Security Systems, "iCenter Advanced User Interface 8142ADT User Guide," pp. 1-136, 2001.
Aprilaire Electronic Thremostats Models 8344, 8346, 8348, 8363, 8365, 8366 Operating Instructions, 8 pages, prior to Dec. 2, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin'Client" Solutions, "Pressure, Air Flow, Temperature, Humidity & Valves," Dwyer Instruments, Inc., 5 pages, printed Sep. 20, 2004.
Blake et al., "Sent 310 Final Project Demo Program," Illustration, 3 pages, Apr. 6, 2001.
Blake et al., "Seng 310 Final Project," Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owner's Manual, pp. 1-17, 2001.
BRK Electronics Maximum Protection Plus Ultimate Convenience Smoke Alarm, 24 pages, prior to Dec. 2, 2003.
BRK First Alert, User's Manual, Smoke and Fire Alarms, pp. 1-7, Nov. 2002.
Bryant, "Installation and Start-Up Instructions Evolution Control SYSTXBBUID01," 12 pages, 2004.
Business Wire, "MicroTouch Specialty Products Group to Capitalize on Growing Market for Low-Cost Digital Matrix Touchscreens,"pp. 1174 (2 pages), Jan. 6, 1999.
Cardio Manual, available at http://www.secant.ca/en/documentation/cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews.Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Dec. 2, 2003.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humididty Control, Outdoor UHF Temperature Transmitter 217S31, 19 pages, Printed Sep. 15, 2004.
File History for ReExam Control No. 95/002,041, U.S. Pat. No. 7,634,504, ReExamination filed Jul. 18, 2012.
CorAccess, "Companion 6," User Guide, pp. 1-20, Jun. 17, 2002.
Danfoss RT51/51 RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," pp. 188-189, 2002.
Domotique Secant Home Automation—Web Page, available at http://www.secant.ca/en/company/default.asp, 1 page, printed Sep. 28, 2004.
Firex Smoke Alarm, Ionization Models AD, ADC Photoelectric Model Pad, 4 pages, prior to Dec. 2, 2003.
Freudenthal et al., "Communicating Extensive Smart Home Functionality to Users of All Ages: The Design of a Mixed-Initiative Multimodal Thermostat-Interface," pp. 34-39, Mar. 12-13, 2001.
Gentex Corporation, 9000 Series, Photoelectric Type Single Station/Multi-Station Smoke Alarms AC Powered with Battery Backup, Installation Instructions—Owner's Information, pp. 9-1 to 9-6, Jan. 1, 1993.
Gentex Corporation, HD135, 135° Fixed Temperature Heat Detector AC Powered, 120V, 60Hz with Battery Backup, Installation Instructions—Owner's Information, pp. 1-5, Jun. 1, 1998.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.

(56) References Cited

OTHER PUBLICATIONS

Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602 A, B, C, D and TS8602 A, C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of Web Pad Device with touch Screen, 1 page; and screen shots of WebPad Device, 4 pages.
Honeywell, "Vision Pro 8000 Touchscreen Programmable Thermostat," Honeywell International Inc., 40 pages, 2004.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.hometoys.com/htinews/apr99/releases/ha101.htm, HTI News Release, pp. 1-3.
http://www.ritetemp.info/rtMenu_13.html, RiteTemp 8082, 6 pages, printed Jun. 20, 2003.
http://www.thermostatsales.com, Robershaw, "9610 Digital Programmable Thermostat," 3 pages, printed Jun. 17, 2004.
http://www.thermostatsales.com, Robershaw, "9700 Digital Programmable Thermostat," 3 pages, printed Jun. 17, 2004.
http://www.thermostatsales.com, Robershaw, "9710 Digital Programmable Thermostat," 3 pages, printed Jun. 17, 2004.
http://www.thermostatsales.com, Robershaw, "9720 Digital Programmable Thermostat," 3 pages, printed Jun. 17, 2004.
Hunter, "44200/44250," Owner's Manual, 32 pages, printed prior to Dec. 2, 2003.
Hunter, "44300/44350," Owner's Manual, 35 pages, printed prior to Dec. 2, 2003.
Hunter, "Auto Saver 550," Owner's Manual Model 44550, 44 pages, printed prior to Dec. 2, 2003.
Install Guide for Ritetemp Thermostat 8082, 6 pages, 2002.
Invensys Deluxe Programmable Thermostats 9700, 9701, 9715, 9720, User's Manual, 21 pages, prior to Dec. 2, 2003.
Lennox, "Network Control Panel (NCP)," User's Manual, 18 pages, Nov. 1999.
Lux TX9000 Installation, 3 pages, prior to Dec. 2, 2003.
Lux, "511 Series Smart Temp Electronic Thermostat," Owner's Manual, 3 pages, printed prior to Dec. 2, 2003.
Lux, "600 Series Smart Temp Electronic Thermostat," Owner's Manual, 3 pages, printed prior to Dec. 2, 2003.
Lux, "602 Series Multi-Stage Programmable Thermostat," Owner's Manual, 3 pages, printed prior to Dec. 2, 2003.
Lux, "605/2110 Series Programmable Heat Pump Thermostat," Owner's Manual, 3 pages, printed prior to Dec. 2, 2003.
Lux, "700/9000 Series Smart Temp Electronic Thermostat," Owner's Manual, 3 pages, printed prior to Dec. 2, 2003.
Lux, "ELV1 Programmable Line Voltage Thermostat," Owner's Manual, 3 pages, printed prior to Dec. 2, 2003.
Lux, "PSPH521 Series Programmable Heat Pump Thermostat," Owner's Manual, 3 pages, printed prior to Dec. 2, 2003.
Lux, "TX1500 Series Smart Temp Electronic Thermostat," Owner's Manual, 6 pages, printed prior to Dec. 2, 2003.
Lux, "TX500 Series Smart Temp Electronic Thermostat," Owner's Manual, 3 pages, printed prior to Dec. 2, 2003.

Metasys, "HVAC PRO for Window's User's Manual," 308 pages, 1998.
Mounting Template for Ritetemp Thermostat 8082, 1 page, 2002.
Operation manual for Ritetemp Touch Screen Thermostat 8082, 8 pages, 2002.
Proliphix Inc., "Web Enabled IP Thermostats," 2 pages, prior to Dec. 2, 2003.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Dec. 2, 2003.
Sealed Unit Parts Co., Inc., Supco & CTC Thermostats . . . Loaded with Features, Designed for Value!, 6 pages, prior to Dec. 2, 2003.
Totaline Model P474-1035 Owner's Manual Programmable 5-2 Day Digital Thermostat, pp. 1-21, prior to Dec. 2, 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Dec. 2, 2003.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Instructions P/N P474-1010," Manual, 2 pages, Dec. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Programmable Thermostat," Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trouble Shooting Guide for Ritetemp Thermostat 8082, 1 page, 2002.
Visor Handheld User Guide, Copyright 1999-2000.
Warmly Yours, "Model TH111GFCI-P (120 VAC)," Manual, pp. 1-4, printed prior to Dec. 2, 2003.
White-Rodgers 1F80-224 Programmable Electronic Digital Thermostat, Installation and Operation Instructions, 8 pages, prior to Dec. 2, 2003.
White-Rodgers Installation Instructions for Heating & Air Conditioning IF78 Non-Programmable Thermostat, 6 pages, prior to Dec. 2, 2003.
White-Rodgers, "Comfort-Set 90 Series Thermostat," Manual, pp. 1-44, printed prior to Dec. 2, 2003.
White-Rodgers, "Comfort-Set III Thermostat," Manual, pp. 1-44, printed prior to Dec. 2, 2003.
White-Rodgers, "Installation Instructions for Heating & Air Conditioning IF72 5/2 Day Programmable Heat Pump Thermostat," 8 pages, printed prior to Dec. 2, 2003.
White-Rodgers, "Installation Instructions for Heating & Air Conditioning IF78 5/2 Day Programmable Thermostat," 7 pages, printed prior to Dec. 2, 2003.
White-Rodgers, Comfort-Set 90 Series Premium, 4 pages, prior to Dec. 2, 2003.
White-Rodgers, IF80-240 "(for Heating Only systems) Programmable Electronic Digital Thermostat," Installation and Operation Instructions, 8 pages, printed prior to Dec. 2, 2003.
White-Rodgers, IF80-241, "Programmable Electronic Digital Thermostat," Installation and Operation Instructions, 6 pages, printed prior to filing date.
White-Rodgers, IF80-261, "Programmable Electronic Digital Thermostat," Installation and Operation Instructions, 8 pages, printed prior to Dec. 2, 2003.

(56) References Cited

OTHER PUBLICATIONS

White-Rodgers, IF81-261, "Programmable Electronic Digital Multi-Stage Thermostat," Installation and Operation Instructions, 8 pages, printed prior to Dec. 2, 2003.
White-Rodgers, IF82-261, "Programmable Electronic Digital Heat Pump Thermostat," Installation and Operation Instructions, 8 pages, prior to Dec. 2, 2003.
www.icmcontrols.com, Simplecomfort, SC3000 Single Stage Heat/Single Stage Cool or Single Stage Heat Pump/Manual Changeover, 1 page, printed prior to Dec. 2, 2003.
www.icmcontrols.com, Simplecomfort, SC3001 Single Stage Heat/Single Stage Cool or Single Stage Heat Pump/Manual Changeover, 1 page, printed prior to Dec. 2, 2003.
www.icmcontrols.com, Simplecomfort, SC3006 Single Stage Heat/Single Stage Cool or Single Stage Heat Pump/Manual Changeover, 1 page, printed prior to Dec. 2, 2003.
www.icmcontrols.com, Simplecomfort, SC3201 2 Stage Heat Pump Manual Changeover, 1 page, printed prior to Dec. 2, 2003.
www.icmcontrols.com, Simplecomfort, SC3801 2 Stage Heat/2 Stage Cool 2 Stage Heat Pump/Audio Changeover, 1 page, printed Dec. 2, 2003.
PCT International Search Report for PCT/US2010/045003 dated Mar. 18, 2011.
Prosecution History from U.S. Appl. No. 12/852,690, dated Nov. 26, 2012 through Jun. 7, 2016, 140 pp.
International Preliminary Report on Patentability from International Application No. PCT/US2010/045003, dated Feb. 21, 2012, 5 pp.

* cited by examiner

CONTEXT-AWARE SMART HOME ENERGY MANAGER

This is a continuation of U.S. patent application Ser. No. 12/852,690 filed Aug. 9, 2010 entitled "Context-Aware Smart Home Energy Manager", which claims the benefit of U.S. Provisional Patent Application 61/234,947 filed Aug. 18, 2009 entitled "Context-Aware Smart Home Energy Manager", both of which are incorporated herein by reference.

TECHNICAL FIELD

Embodiments are generally related to energy management. Embodiments are additionally related to energy management of household consumer appliances. Embodiments are further related to a control interface for energy management of household consumer appliances.

BACKGROUND OF THE INVENTION

Net zero energy (NZE) homes are structures that combine state-of-the-art, energy-efficient construction techniques and equipment, with renewable energy systems to return as much energy as it uses on an annual basis. To achieve NZE use in a home, a comprehensive energy reduction strategy is required, including the use of efficient appliances, renewable energy resources, and efficient home energy management capable of adapting to the occupant's lifestyle. Energy management concepts and technologies reduce wasteful energy consumption, reduce peak electricity demand, integrate renewable energy and storage technology, and change the occupant's behavior for the occupant to learn how to manage and consume less energy.

A home typically uses unmanaged appliances with minimal planning and inefficient scheduling. It is impossible to formulate a home energy plan without a holistic view of home occupancy, usage patterns, demand peaks, or weather effects on home energy usage. Further, without dynamic energy pricing, current NZE strategies fall short as technology focuses on user awareness of energy consumption, basic demand response (DR), and fixed programmable schedule's with minimal ability to control and schedule energy consumption. Current DR solutions for energy usage range from simple pager-based solutions to sophisticated appliances, with little homeowner participation or input. Homeowners may try to reduce household energy use by turning off the air conditioning during certain parts of the day or heating the pool to lower temperatures. This approach, however, does not take into account reducing the energy use of all the appliances and consumer electronics, as a collective system, within a home. Other apparatuses and techniques exist to facilitate the efficient operation of the energy consuming devices, including programmable electronic thermostats and various timers for lighting, water heaters, and pool heaters. But these apparatuses, do not communicate with each other through a centralized system to efficiently manage energy use within a home. Such solutions simply shift energy consumption and do not help achieve NZE goals.

A comprehensive home energy use management system is needed to coordinate efficient and smart appliances, other energy consuming devices, and renewable energy resources. This home energy use management system also needs to recognize and adjust energy use to varying, occupancy levels and conditions within the home. By accommodating to the lifestyle of the occupants, and properly scheduling use of appliances, a large percentage of energy can be saved.

Therefore, a need exists for a context-aware smart home energy manager (CASHEM) to coordinate and conserve energy use in the home, as will be discussed in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking into consideration the entire specification, claims, drawings, and abstract as a whole.

It is, therefore one aspect of the disclosed embodiment to provide for an improved energy management system and method. It is another aspect of the disclosed embodiment to provide for an improved energy management system and method for household consumer appliances.

It is a further aspect of the disclosed embodiment to provide for a control interface for energy management of household consumer appliances.

The aforementioned aspects and other objectives and advantages can now be achieved as described herein. A context-aware smart home energy management (CASHEM) system and method is disclosed. "Context-awareness" describes the conditions of energy consumption in the house. CASHEM identifies contextual information within said household, selects a comfort of service preference based on previously expressed homeowner preferences, and generates an appliance use schedule for maximum energy savings based on said contextual information in light of said comfort of service preferences. It does this by executing a program instruction in a data processing apparatus. Once running, CASHEM continues to monitor actual appliance use and identifies additional opportunities for energy savings that match up with the homeowner's evolving energy use behavior. Part and parcel to this is the use various incentives to motivate energy use behavior change in the desired direction. An energy manager display coordinates and gathers said user preferences to formulate a dynamic energy-savings plan for a household.

BRIEF DESCRIPTION OF THE DRAWINGS

The accompanying figures, in which like reference numerals refer to identical or functionally-similar elements throughout the separate views and which are incorporated in and form a part of the specification, further illustrate the invention and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
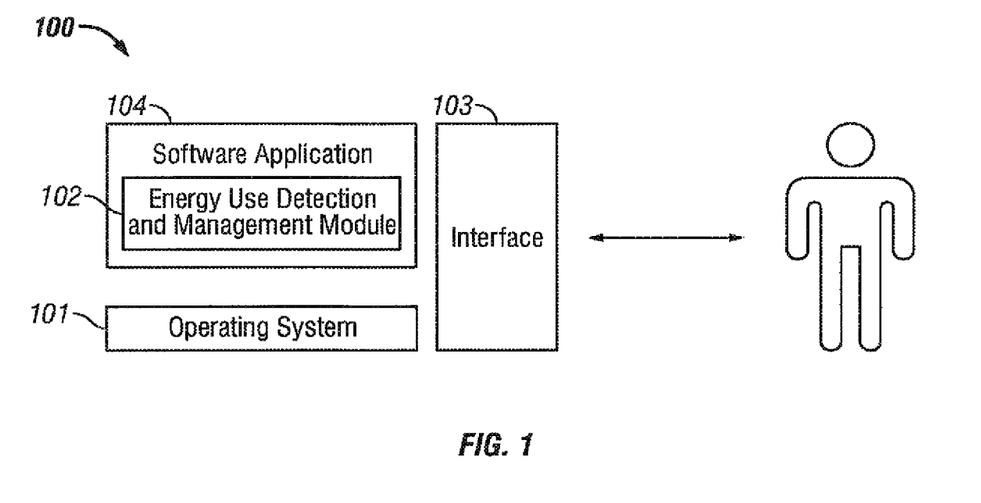
FIG. 1 illustrates a schematic view of a software system including an operating system, application software, and a user interface, in accordance with the disclosed embodiments.
Figure 2:
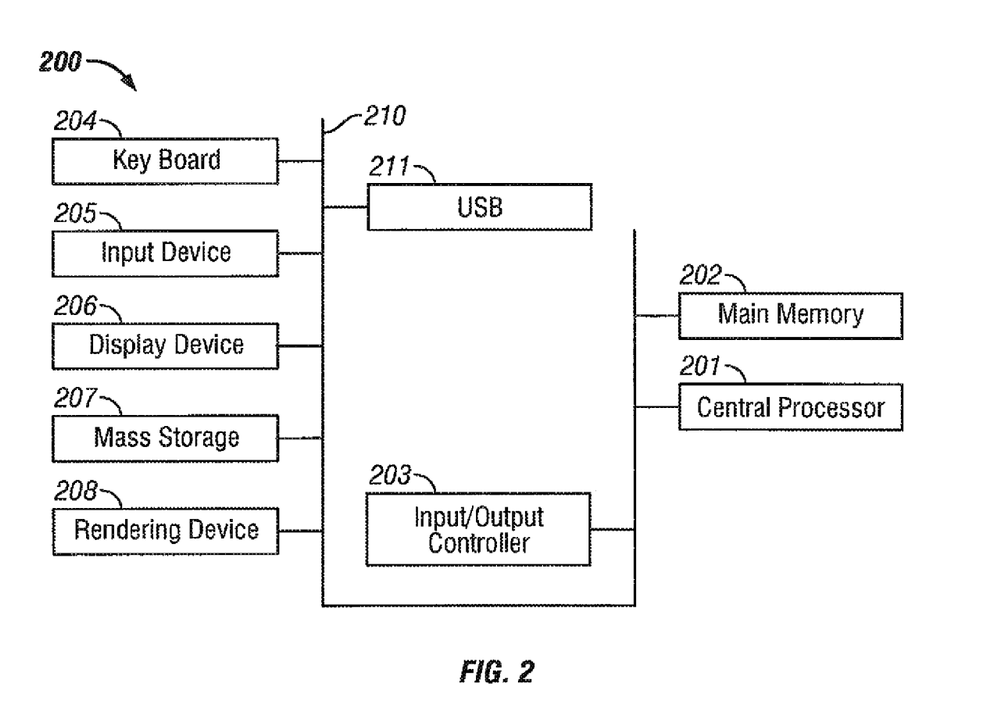
FIG. 2 illustrates a schematic view of a data-processing system, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects of embodiments of the disclosed embodiments may be implemented/Many modifications to the depicted environments may be made without departing from the spirit and scope of the disclosed embodiments.

FIG. 1 illustrates a computer software system 100 for directing the operation of the data-processing system 200 depicted in FIG. 2. Software application 104, stored in main memory 202 and on mass storage 207 (as described in FIG. 2), generally includes a kernel or operating system 101 and a shell or interface 103. One or more application programs, such as software application 104, may be "loaded" (i.e., transferred from mass storage 207 into the main memory 202) for execution by the data-processing system 200. The data-processing system 200 receives user commands and data through user interface 103; these inputs may then be acted upon by the data-processing system 100 in accordance with instructions from operating system module 101 and/or software application 104.

As illustrated in FIG. 2, the disclosed embodiments may be implemented in the context of a data-processing system 200 that includes, for example, a central processor 201, a main memory 202, an input/output controller 203, a keyboard 204, an input device 205 (e.g., a pointing device, such as a mouse, track ball, pen device, etc.), a display device 206, a mass storage 207 (e.g., a hard disk), and a USB (Universal Serial Bus) peripheral connection 211. Additional input/output devices, such as a rendering device 208 (e.g., printer, scanner, fax machine, etc.), for example, may be associated with the data-processing system 200 as desired. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 103 can include, for example, a graphical user interface (GUI) or an interactive speech interface. The interface 103 can serve to display results, whereupon a user may supply additional inputs or terminate a particular session. In some embodiments, operating system 101 and interface 103 can be implemented in the context of a "Windows" system. It can be appreciated, of course, that other types of systems are possible. For example, rather than a traditional 'Windows" system, other operation systems, such as, for example, Linux may also be employed with respect to operating system 101 and interface 103. The software application 104 can include, for example, an energy use detection and management module 102 for providing a CASHEM. The energy use detection and management module 102 can include instructions, such as those of method 300 and 400 discussed herein with respect to FIGS. 3-4.

FIGS. 1-2 are thus intended as an example, and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, a real time OS/kernel and the like.

Figure 3:
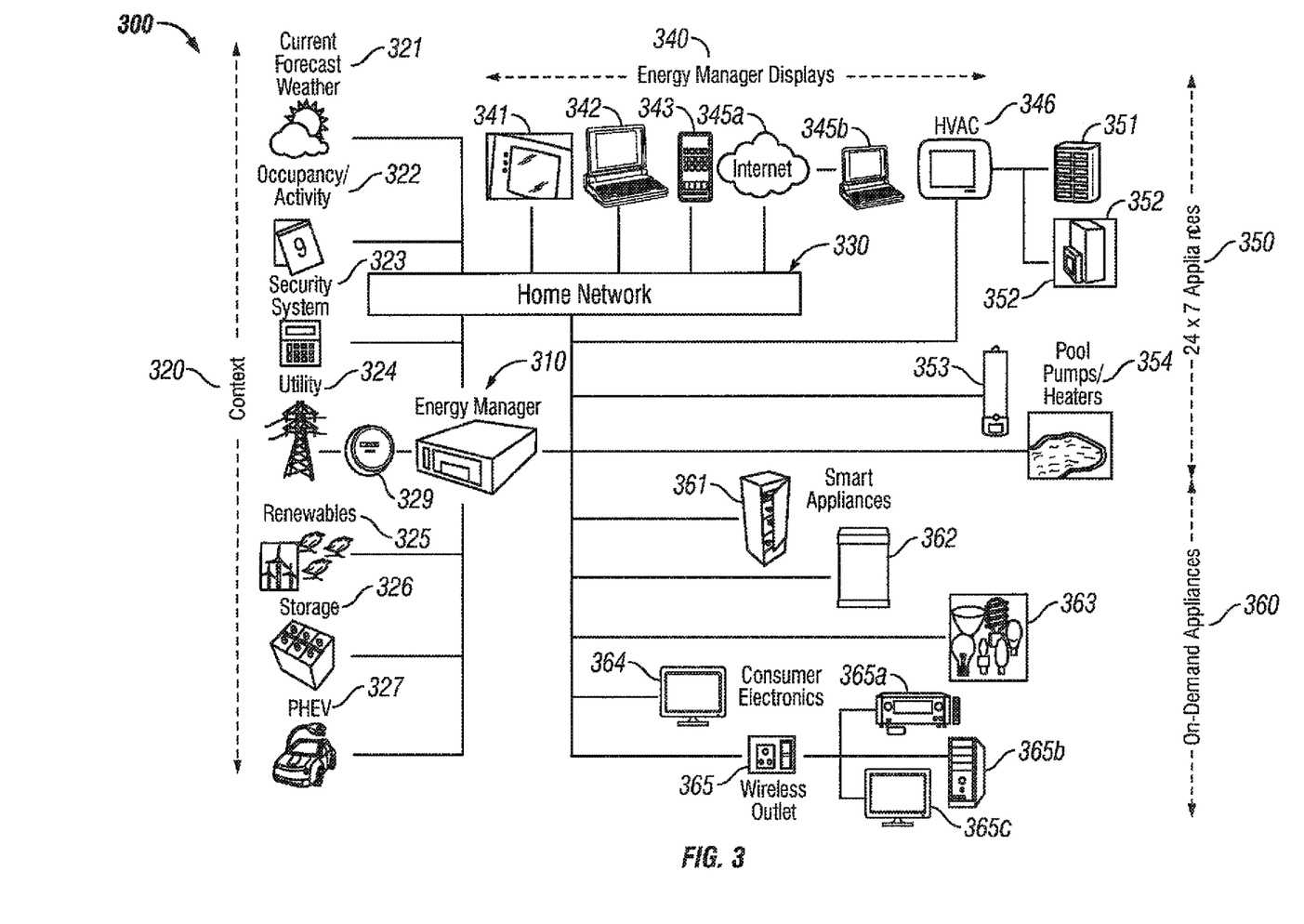
FIG. 3 illustrates a graphical representation of a computer-implemented context-aware smart home energy management system (CASHEM), in accordance with the disclosed embodiments.

FIG. 3 illustrates a graphical representation of a computer-implemented context-aware smart home energy manager (CASHEM) 310, in accordance with the disclosed embodiments. CASHEM recognizes and adjusts to different conditions around, and within, a house 320, 340, 350, 360 to minimize total energy consumption. Note that in FIGS. 1-9 identical parts or elements are generally indicated by identical reference numerals. The disclosed embodiments take advantage of dynamically planning, scheduling and programming the different appliances of the house based on these different conditions and the expressed user preferences within the different conditions. The term "appliance" refers to any device in the home that consumes, stores or produces energy. Depending on the varying conditions 320, a home's appliances 350, 360 can operate at lower or higher energy consumption levels based on the comfort or convenience level demanded by the occupant. Adaptation of the appliance coordination system can be supported based on monitoring and analysis of occupant's activity and the use of the appliances. The appliance tasks can also be shifted at some time in the future to consume less energy based on the forecasted weather condition 321. CASHEM 310 is designed to work with existing homes and appliances, and grow its capabilities as smart appliances and other components are added to the home. CASHEM 310 can be the hub for communicating with appliances 350, 360 and use information from different operational, environmental, and energy supply type parameters. As context sensors become available, CASHEM 310 can use the sensors for enhanced energy management.

CASHEM 310 integrates renewable energy sources into the home and reduces overall energy consumption. By increasing the focus on systems design, integration, and control, CASHEM 310 serves as a central point to collect information from all available sources and build the big picture necessary to manage energy consumption. To build the big picture of a home's energy usage 300, the computer-implemented home network 330 connects a home's energy-use contexts 320, a home's energy manager displays 340, and a home's appliances, including both 24/7-type appliances 350 and on-demand appliances 360. The home energy manager 310 connects to a home's energy meter 329 to collect electricity use information.

Context-awareness" describes the conditions of energy consumption in the house. CASHEM's 310 objective is to identify the current contextual state 320, 340 350, 360, note the user preference associated with that current state, and then configure a context-driven, appliance-use, convenience, or comfort, of service (CoS) model. The CoS model correlates the different contexts with energy consumption levels, and dynamically schedules the appliances 350, 360 under the stated conditions, based on efficient energy consumption and occupancy comfort. The type and amount of CoS deviation can vary between different homeowners with homeowners submitting CoS preferences at system configuration time. CASHEM 310 reduces energy consumption while keeping the user comfortable by adapting its recommendations to the occupant's expressed CoS preferences. The system 310 can also monitor and analyze energy consumption, recommend further energy saving actions, and engage/motivate the homeowner to adopt those recommendations.

Contexts 320 that the system 300 gathers to formulate CoS preferences include, but are not limited to: weather conditions 321, both current and forecasted; occupancy and occupancy activity information 322; security system information 323; utility information 324; renewable energy-use information 325; energy storage information 326; and plug-in hybrid electric vehicle (PHEV) information 327. CASHEM 310 integrates on-site energy generation and renewable energy sources 325. With context-aware characteristics, CASHEM 310 can coordinate use of wind and solar energy with charging a hybrid electric vehicle to minimize energy consumption and reduce carbon footprints. Combined heat and power is becoming practical in some northern climates, while photovoltaic panels are becoming cost-effective in the southwest. Energy storage, particularly in the form of plug in hybrid electric vehicles, is also making its way into homes.

CASHEM 310 coordinates energy manager displays 340 when gathering a home's context information 320 to appropriately adjust energy consumption. Energy manager displays include, but are not limited to: In Home Displays 341; computing device 342, mobile communications devices, such as a Smartphone 343, a computing device 3458 connected to the Internet 345A, HVAC controls 346 for cooling 351 and heating devices 352.

An energy efficient home can have smart appliances capable of one or two-way communication with CASHEM 310. The central communications and data integration allows the home to be treated as a system 300 as opposed to a collection of independent, non-communicating appliances. CASHEM 310 can coordinate different types of appliances, including both 24/7-type appliances 350 and on-demand appliances. 24/7-type appliances include those appliances used nearly twenty-four hours of a day, for seven days a week. These include cooling 351 and heating 352 units, water heaters 353, pool pumps and heaters 354, refrigerators and freezers 361. On-demand appliance's 360 include those appliances used less frequently than 24/7-type appliances 350. On-demand appliances include, but are not limited to: dishwashers 362, lighting 363, consumer electronics, such as entertainment devices 364, appliances that run off of wireless controlled outlets 365, including stereos 365A, computing devices 3658, and_televisions 365C. CASHEM can integrate other similar sensors and systems when additional appliances are used in the home, such as security systems, smoke detectors, HVAC, structured wiring, energy management, and video, to provide one integrated system.

CASHEM 310 alerts users to pending problems through the home's IP network 330. Condition-based monitoring (CBM) techniques can be scaled down and integrated in CASHEM 310. Alerts to the homeowner through various energy manager displays 340 can be as simple as, for example, "The furnace has run 265 hours since the filter was changed." CASHEM can use abnormal vibration detection to identify potential problems in HVAC systems. CASHEM enables two-way communication with the electrical grid 324 to obtain real-time pricing and demand response events via an open automated demand response (OpenADR) server or other mechanism that complies with National Institute of Standards and Technology standards.

By adjusting to the occupant's preferences and behaviors under different activity or occupancy conditions of the house, appliance energy consumption is reduced while keeping the occupants satisfied with a desirable CoS for each appliance under the different conditions. The capabilities of the system 300 shown in FIG. 3 are best described through a series of non-limiting CASHEM 310 use cases, as follows:

Example 1

Sleep mode activation: The homeowner goes to bed early 32.2 CASHEM 310 is notified by the security system 323, which triggers the HVAC system 346 to go into "Sleep" mode. CASHEM 310 also enables the dishwasher 362 and dryer to complete their pending cycles. The water heater's 353 settings are changed to reflect reduced energy consumption 329. The entertainment devices 364 and lighting 363 are scheduled turn off to reduce or eliminate energy consumption 329.

Example 2

Vacation scheduling: Before leaving on vacation 322, the homeowner notifies CASHEM 310. The online calendar indicates that the homeowner can be away for a week 322. CASHEM 310 transmits requests to all appliances 350, 360 to either shutdown or switch to vacation mode. Other appliances 350, 360 may be shut down or switched to vacation mode including: managing the HVAC system 346, setting the water heater 353 and refrigerator 361 to power saving modes, turning the entertainment system 364 off, lowering the set point on the pool heater and pump 354 and turning off lighting 363, as appropriate. Later in the week, CASHEM 310 is notified of the Homeowner's impending return 322 through an SMS text message on a Smartphone 343, or an e-mail or Tweet™ on a computer device connected to the internet 345b. In response, CASHEM 310 prepares the home for a homeowner's arrival.

Example 3

Convenience of Service: CASHEM 310 is aware of the homeowner's CoS requirements. The homeowner prioritized on the side of energy conservation. During the cooling season 321, CASHEM 310 looks for opportunities to bring in outside air 325 whenever feasible instead of running the air conditioner 351 even though this can affect humidity levels in the home.

Example 4

Adaptation of Schedule for 24/7 Appliances 350: CASHEM 310 noted that the homeowners schedule has changed 322 due to seasonal factors. CASHEM 310 determines a new energy-usage schedule that better reflects the energy usage of the home 322 and presents it to the homeowner. With the homeowner's concurrence, the new schedule is put into trial service. Later the new schedule is accepted as a permanent energy usage schedule.

Example 5

Adaptation for On-Demand Appliances 360: CASHEM 310 has identified that the dishwasher 362 is generally run after dinner 322 with high CoS settings. Given time-of-use pricing and the desire of the Homeowner to conserve energy 329, CASHEM 310 recommends using the dishwasher's 362 delay feature to start washing after the lower prices set in. It also suggests using air drying mode, since the clean dishes are not needed until the morning.

Example 6

Predictive Load Management: It is Friday and the weather 321 is expected to be unusually hot. The utilities 324 issued a peak pricing alert for the afternoon, but the homeowner generally works from home 322 on Fridays. CASHEM 310 anticipates cooling needs and pre-cools 351 the house during the morning hours on Friday to reduce the load during peak hours, and raises the set point of the HVAC system 346.

Example 7

Demand response and dynamic pricing: CASHEM 310 is notified that peak pricing can be in effect and responds by taking actions pre-approved by the homeowner to reduce demand on the utilities 324. Typical responses might include reducing set points of HVAC 346, water heater 353, pool pump and heater 354, and delaying the start of energy consuming appliances 350, 360 such as dishwashers 362 and dryers. Depending on the criticality of the pricing request and the CoS settings, more conservative actions can be taken.

Example 8

Renewable energy management: The home is equipped with a small wind turbine 325 and battery storage 326. During the cooling season, the wind forecast 321 indicates significant generation potential overnight. Knowing the off-peak utility pricing and the health and capacity of the battery 326, CASHEM 310 decides to first charge the battery 326 then uses the excess energy to pre-cool in anticipation of a hot summer day.

Figure 4:
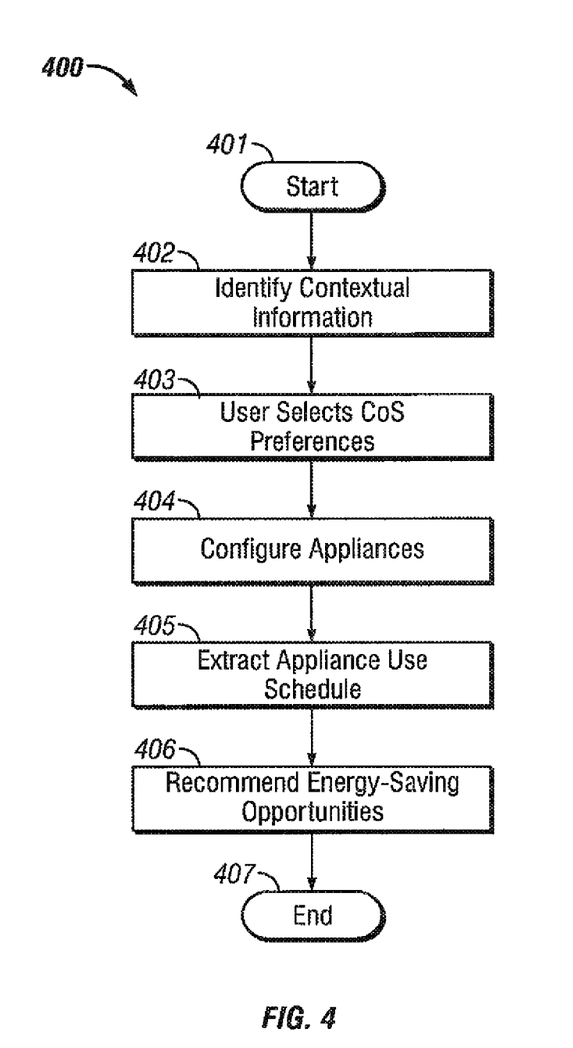
FIG. 4 illustrates a flow chart illustrating the logical operation steps of CASHEM's operation, in accordance with the disclosed embodiments.

Illustrated in FIG. 4 is a flow chart illustrating the logical operation steps of CASHEM's 310 operation, in accordance with the disclosed embodiments. As illustrated in block 401, the CASHEM process is initiated. CASHEM 310 first identifies contextual information that affects the CoS of home appliances as illustrated in block 402. As illustrated in block 403, the user selects CoS preferences on the computer-human graphical user interface 103 (GUI), as shown in FIG. 1. The GUI is provided to display and capture the occupant's appliance operation preferences and convenience constraints. Next, the appliances are configured for the different home conditions using a selected CoS preference, as illustrated in block 404. CASHEM 310 then extracts an appliance use schedule to run the appliances at an efficient rate to guide the occupant to either test or comply with further energy saving opportunities, as illustrated in block 405. Through data monitoring, the system can analyze energy consumption under different conditions and recommend to the user further energy saving opportunities, as illustrated in block 406. The CASHEM controller continues to process and identify contextual information and configure appliances, even when the user has not provided new CoS preferences, as illustrated in block 407.

CASHEM 310 first identifies contextual information that affects the CoS of home appliances, as illustrated in block 402. Context describes a setting or a situation that impacts the energy consumption of an appliance. Awareness of the context with respect to the occupant or the home environment is used to significantly reduce energy consumption without compromising the occupant's comfort and convenience. Recognizing different types of contexts can dictate development of efficient modes of operations for home appliances. Three main types of context information exist as a function of time that potentially affect energy consumption, as follows:

Operational conditions: These are mainly driven by the user's occupancy and can be summarized by short and long term schedule. According to the user schedule, different user modes can be identified as a function of time. For example, these user modes include In, Vacation, At the Office, Sleeping, Party, etc.

Environmental conditions: This context type is typically related to the current and predicted weather conditions around the house. If the current and forecasted weather are known, some appliance systems, such as HVAC, can potentially utilize efficient operational strategies. Also, weather information such as sunny or windy conditions can affect the renewable energy supply use in the home.

Energy supply type and/or cost conditions: This information is important for the integration and management of renewable sources. It is related to the reliability of the current and predicted energy supply from the available sources of energy. It also includes the different utility signals including at least one of the following signals: demand response (DR) real-time-pricing (RTP) information, time-of-use (TOU) tariff.

As illustrated in block 403, the user selects CoS preferences. The primary objective of CASHEM is to reduce the total energy consumption around the house by providing an integrated and optimal schedule that reflects the CoS for each appliance at different times of the day. The gathered context information helps develop a specific CoS level for a particular home. The CoS settings are driven by the variations in context types. Based on the homeowner preferences and convenience constraints under different conditions or context information of the house, CASHEM knows and recommends the best way of operating the home appliances and renewable resources while meeting the requested convenience constraint.

A CoS for renewable resources can also be defined according to the estimated supply and related uncertainty level of the supplied energy. A CoS metric is then applied to the different appliances. The CoS level is related to the time it takes to finish a job, or the thermal comfort in an environment. The CoS is typically correlated to the amount of energy consumed. Based on the condition driven by the context, the user can configure the CoS of an appliance for that particular condition. The CoS can also provide a range base control versus set point control to provide the occupant with a choice between comfort vs. energy conservation. For example, when the occupant "IN", the CoS is 76+/−2 degrees F.; when the occupant is "ON VACATION", the CoS is 62+/−4 degrees F.; and, when the occupant is in the office, the CoS is 70+/−4 degrees F. The temperature range points are mapped to a CoS metric. The user can change these CoS values under different supply type modes, such as DR mode from utilities, solar supply, or wind supply.

Once a CoS level is developed, a home's appliances are configured, as illustrated in block 404. The initial operational context extraction related to homeowner activity or schedule can be implemented using programmable thermostats. Two approaches are typically used to assess context information: direct sensing measurements and indirect, inferred by integrating information from multiple sensors. The static schedule can be enhanced by making use of more accurate context extraction that is related to the user's activity. Home appliances are first categorized under distinct categories, either as on-demand or 24/7 appliances, before developing a CoS level, as follows:

On demand (OD) appliances are activated randomly, or scheduled by external trigger. OD appliances include clothes washers and dryers, dishwashers, televisions, lighting, etc. These systems generally have discrete modes of operation. For on-demand appliances, the task is to correlate the convenience constraints, typically time range of use, to the energy consumption for the discrete modes of operation. In general, the goal for the OD appliances is to move to a lower CoS for the given condition, or move the task to a different time of the day. For example, CASHEM can recommend washing dishes in three hours instead of two when the user is IN, or move the task to "SLEEP" time and wash the dishes in 5 hours.

For 24/7 appliances, the energy savings can be achieved by recommending a lower CoS for a given condition or reducing the time of the highest quality conditions. For example, a user could either lower the heating set point from 72 to 68 deg F. for "IN" or shrink the "IN" time to 7 hours instead of 8 hours based on occupancy data. 24/7 appliances generally have continuous modes of operation, such as controlling to a set point. These appliances also have transitional modes of operations that move from one set point to another, such as pre-heating or pre-cooling modes. 24/7 appliances include equipment such as HVAC systems, water heaters, pool heaters and pool pumps. The task for the 24/7 appliances can be similar to the on-demand appliances. Weather conditions, however, can affect the relationship and need to be included in the assignment of a CoS analysis. For example, to maintain 76 degrees F. for cooling conditions, ventilation can be provided if the outdoor temperature is low. An example of CoS for heating and cooling is a comfort index that can be calculated based on temperature or more broadly based on a predicted mean vote (PMV) (**) index that is based on actual temperature, humidity, wind velocity, user activity and clothing. Some of these parameters can be configured or estimated seasonally. The user can indicate his or her tolerance of comfort range based on activity, weather, and energy supply type.

As illustrated in block 405, CASHEM then extracts an appliance use schedule. Under a given CoS, CASHEM can then select the best mode for a particular appliance in-each category and estimate the energy consumed under a given CoS. A static schedule is developed first. Typically, the static schedule during the initial setup results in adherence to CoS preferences and lower energy savings. CASHEM can also evaluate the cost of energy and recommend a more efficient schedule based on energy cost while maintaining homeowner satisfaction. In other 'cases, the schedule can deviate enough that the unhappy user can turn off the scheduling mode. CASHEM can reduce peaks using a combination of range base control and load shifting via predicted scheduling. When a demand peak is signaled, CASHEM can automatically shed loads based on information from the homeowner. CASHEM can supervise and properly schedule all the appliances during demand response by multiple set point strategy for example, delaying running the dehumidifier until well after the peak load. For additional energy savings, CASHEM can respond to non-scheduled events requested by the user.

As illustrated in block 406, CASHEM provides the user with recommended energy-saving opportunities based on the data collected and user-inputted CoS preferences. CASHEM provides recommendation to the user to educate the user on current energy savings and future modifications to CoS preferences to further increase energy savings. The process ends, as illustrated in block 407.

Figure 5A:
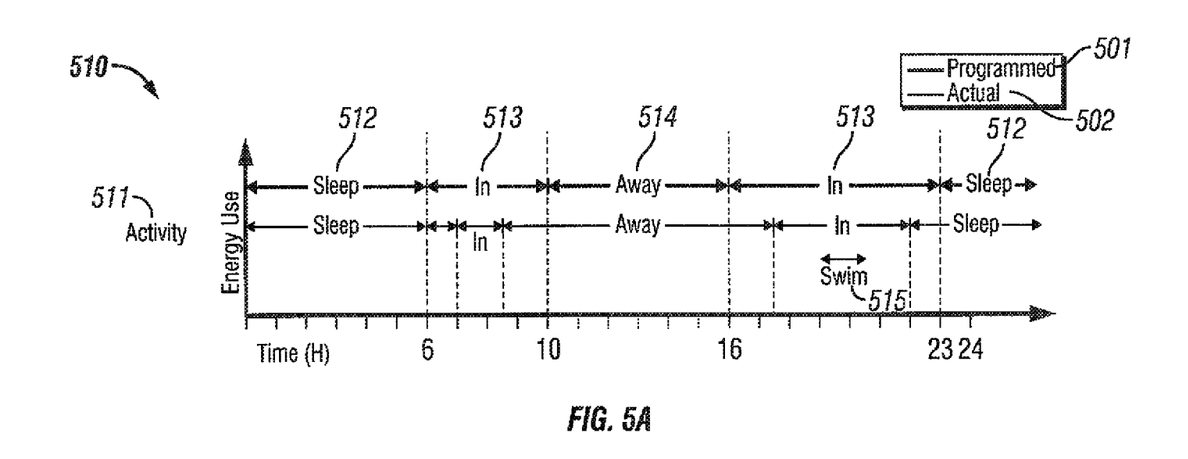
FIGS. 5A-5B illustrates graphical representations model of energy savings using CASHEM's dynamic scheduling based on various activities, in accordance with the disclosed embodiments.
Figure 5B:
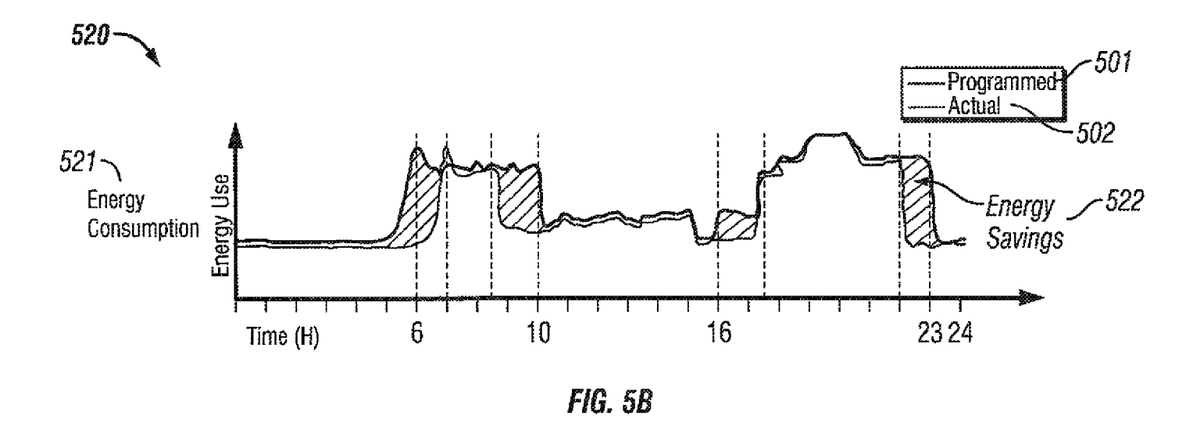

FIGS. 5A-5B illustrate graphical representations of energy savings using CASHEM's dynamic scheduling based on various activities 511. For example, FIG. 5A illustrates energy savings when using CASHEM 510 based on user's activity levels 511. CoS preferences for different activity levels 511 are used to program 501 the energy-use levels of various appliances over a twenty-four hour period. A user programs 501 energy use levels for "Sleep" modes 512, "In" modes 513, an "Away" mode 514, and a "Swim" mode 515, for example. CASHEM dynamically schedules actual energy use 502 based on these CoS preferences for particular activities 511, but also incorporates energy saving techniques discussed herein. Therefore, CASHEM lowers actual energy use 502 for all scheduled modes 512-515, as illustrated in FIG. 5B. During sleep modes 512, energy use is lower than energy use during "In" 513 and "Swim" 515 modes. CASHEM's dynamical scheduling for lower energy use results in energy savings 522 especially during modes of higher energy use.

Figure 5C:
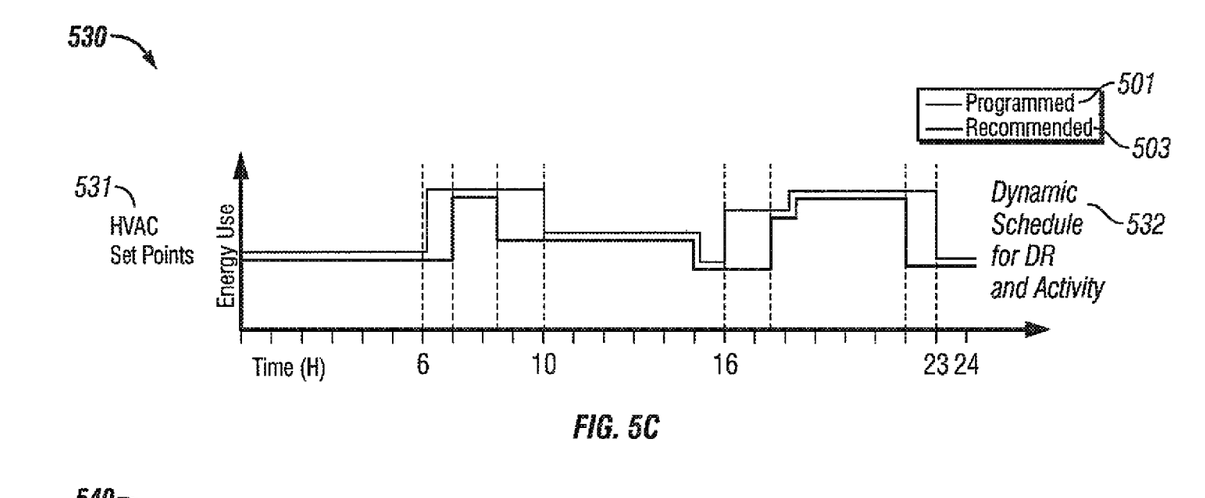
FIGS. 5C-5D illustrates graphical representations • model of energy savings when using CASHEM's dynamic scheduling techniques to provide a user with a recommended energy savings usage plan, in accordance with the disclosed embodiments.
Figure 5D:
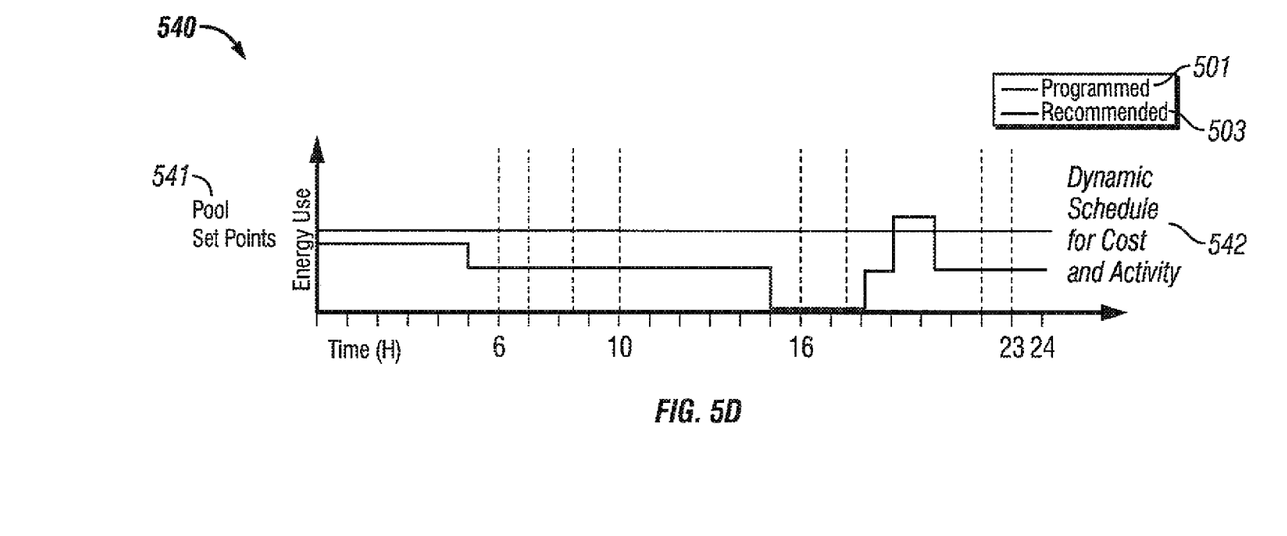

FIGS. 5C-5D illustrate graphical representations of energy savings when using CASHEM's dynamic scheduling techniques to provide a user with a recommended 503 energy savings usage plan. For example, in FIG. 5C, CASHEM 520 uses HVAC set points 531 to dynamically schedule for DR and activity 532. CASHEM's recommended 503 energy use levels are lower than programmed energy use levels 501. Similarly in FIG. 5D, CASHEM 530 uses pool set points 534 to dynamically schedule for cost and activity 542. CASHEM's recommended 503 energy use levels are lower than programmed energy levels 501, as well.

Figure 6A:
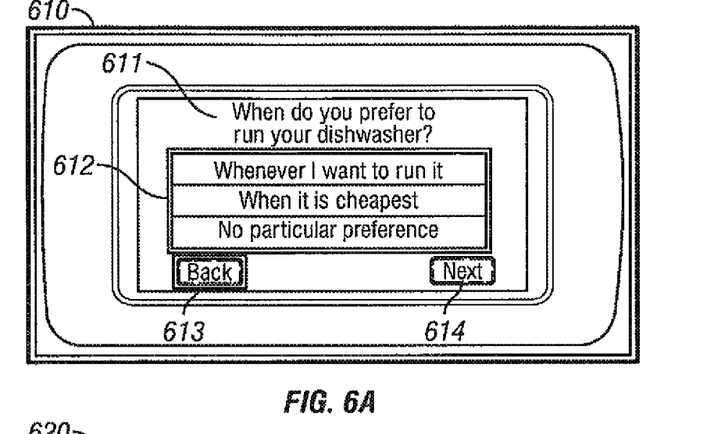
FIGS. 6A-6E illustrate a graphical user interface (GUI) for interaction with the context-aware smart home energy management system (CASHEM), in accordance with the disclosed embodiments.

CoS preferences and CASHEM options are programmed using a graphical user interface (GUI), as illustrated in FIGS. 6A-6E. FIG. 6A illustrates a GUI 610-650 for display of CASHEM options, in accordance with the disclosed embodiments. Note that the GUI 610, 620, 630, 640, and/or 650 can be implemented utilizing a GUI such as, for example, the interface 103 depicted in FIG. 1 herein, and may be provided by a module, such as, for example, module 102 (i.e., a software application). GUI 610, 620, 630, 640, and/or 650 can be displayed via a display device such as a monitor 206 depicted in FIG. 2. In the illustrated figures herein, the depicted GUI can be implemented in the context of a GUI "window". Note that in computing, a GUI window is generally a visual area containing some type of user interface (e.g., GUI 103). Such a "window" usually (but not always) possesses a rectangular shape, and displays the output of and may allow input to one or more processes. Such windows are primarily associated with graphical displays, where they can be manipulated with a mouse cursor, such as, for example, the pointing device 205 depicted in FIG. 2. The user may use a mouse, joystick, light pen, roller-ball, keyboard, finger or other peripheral devices for manipulating the pointing device 205 over the GUI 610. For example, CASHEM options directly on the GUI 610. A GUI using windows as one of its main "metaphors" is often referred to as a windowing system.

The GUI 610-650 may include one or more active windows or panes. In one implementation, four primary panes may be provided, including a CASHEM query pane 601, a query response selection pane 602, a "Back" pane 603 to skip back to the previous GUI display window, and a "Next" pane 604 to move forward to the next GUI display window. These will be discussed in more detail below. Other windows and panes may similarly be provided. Various mechanisms for minimizing, maximizing, moving, and/or changing the dimensions or the individual panes, may be provided as typically found in a windows environment.

The disclosed GUI 610-650 uses a simple question and answer paradigm to account for wide variations in occupants' perception, definitions, and tolerance of different comfort levels. Therefore, one of the keys to acceptance and compliance with CASHEM's energy-saving recommendations is to tailor the energy tradeoffs to individual homeowners. CASHEM initially extracts schedules for every appliance and the related CoS range from the homeowner in a series of interview questions presented on the GUI 610-650. Thus, the homeowner does not need to be a programmer to implement an energy-savings plan. With the success of the system riding on the computer-human interaction, a homeowner interface to CASHEM engages individual homeowners to indicate their own personal constraints for comfort and convenience, provides a simple paradigm for homeowners to review and understand energy management recommendations made by the system, and communicates the value of these recommendations, thereby motivating the homeowner to comply. Improper use of programmable GUI's can reduce or completely eliminate energy savings, so occupants need easy to use, innovative GUI designs for programmable thermostats, for example, to ensure energy savings.

Figure 6B:
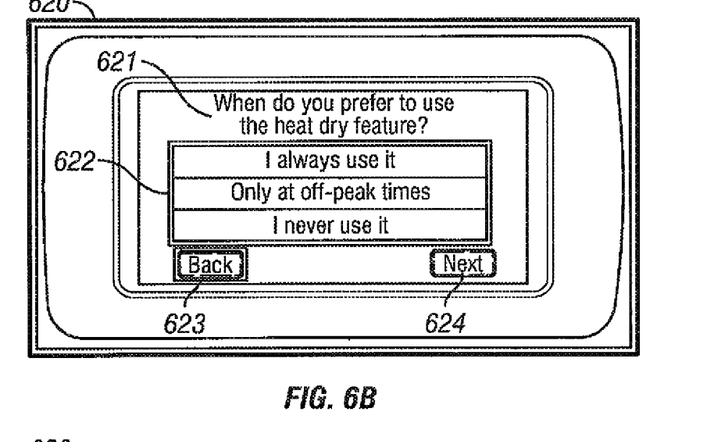
Figure 6C:
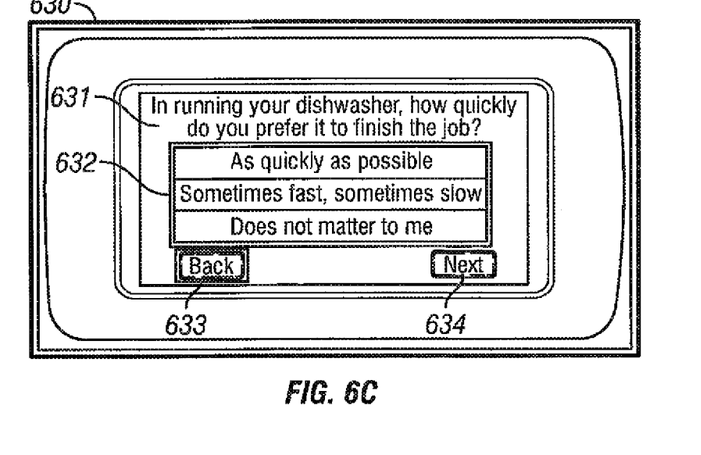
Figure 6D:
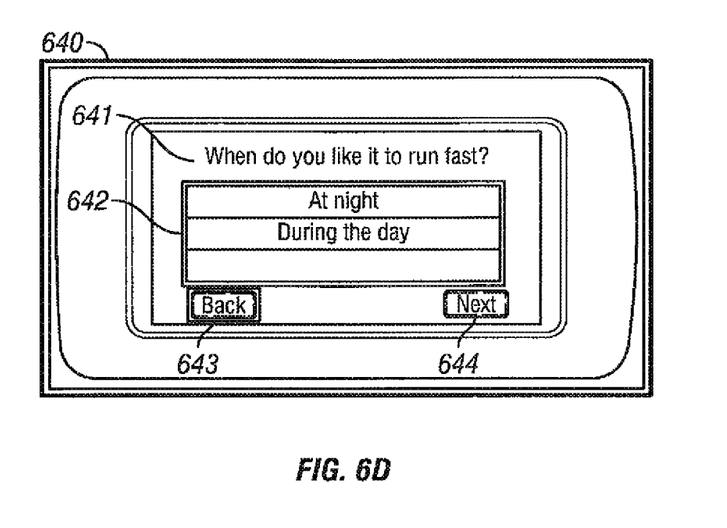
Figure 6E:
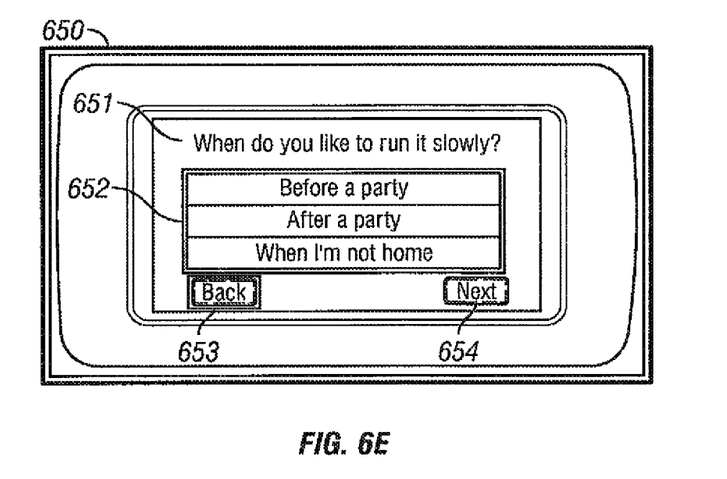

CASHEM poses queries 611-651 to users and considers all query responses 612-652 to formulate energy use schedules and recommendations for every appliance. For example, in FIG. 6A, GUI 610 displays a query 611 asking the user, "When do you prefer to run your dishwasher?" The user can select a query response 612 indicating the preferred time, or select the "Back" pane 613 to skip back to the previous query. When the user makes a selection from the query response pane 612, or selects the "Next" pane 614 to skip this pane, the GUI 620 display appears as illustrated in FIG. 6B. The next query 621 displayed in GUI 620 asks the user, "When do you prefer to use the heat dry feature?" The user can select a query response 622 indicating the preferred time, or select the "Back" pane 623 to skip back to the previous query. When the user makes a selection from the query response pane 622, or selects the "Next" pane 624, the GUI 630 display appears as illustrated in FIG. 6C. The next query 631 displayed in GUI 630 asks the user, "In running your dishwasher, how quickly do you prefer to finish the job?" The user can select a query response 632 indicating the preferred selection, or select the "Back" pane 633 to skip back to the previous query. When the user makes a selection from the query response pane 632, or selects the "Next" pane 634, the GUI 640 display appears as illustrated in FIG. 6D. The next query 641 displayed in GUI 640 asks the user, "When do you like to run it fast?" The user can select a query response 642 indicating the preferred selection, or select the "Back" pane 643 to skip back to the previous query. When the user makes a selection from the query response pane 642, or selects the "Next" pane 644, the GUI 650 display appears as illustrated in FIG. 6E. The next query 651 displayed in GUI 650 asks the user, "When do you like to run it slowly?" The user can either select a query response 652 indicating the preferred selection, select the "Back" pane 653 to skip back to the previous query, or select the "Next" pane 654, for any further queries related to this appliance. This question and answer process continues for CASHEM to gather enough CoS preferences and context information to formulate a comprehensive energy-savings schedule for all appliances within a home.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for scheduling household energy use, wherein the household includes at least two appliances including a dishwasher, the method comprising:
querying a user about a user's preferences for each of the at least two appliances via a user interface including providing one or more interview questions each with two or more selectable predefined answers, wherein the one or more interview questions include a question asking whether to delay a heat-dry operation of the dishwasher until an off-peak time;
accepting via the user interface a selected predefined answer to each of the one or more interview questions, which reveals an indication of the user's preferences for each of the at least two appliances;

determining an appliance use schedule for each of the at least two appliances based, at least in part, on the selected predefined answers to the one or more interview questions; and delaying the heat-dry operation of the dishwasher based on an answer to the question asking whether to delay the heat-dry operation of the dishwasher until the off-peak time.

2. The method of claim 1, further comprising displaying via the user interface a recommendation for the user to accept the determined appliance use schedule for at least one of the appliances before putting the recommended appliance use schedule into service.

3. The method of claim 1, further comprising displaying a recommended change to the user's preferences for at least one of the at least two appliances to achieve greater energy savings.

4. The method of claim 1, wherein one of the at least two appliances comprises a 24/7 appliance and another one of the at least two appliances is an on-demand appliance.

5. The method of claim 1, further comprising receiving contextual information about the household at a home energy manager that is operatively coupled to the at least two appliances, where the contextual information includes at least one of the following:
current weather information;
forecast weather information;
security system information;
utility information;
renewable energy-use information;
energy storage information;
energy supply type; and
utility signals including at least one of the following types of signals: demand response (DR), real-time-pricing (RTP) information, time-of-use (TOU) tariff.

6. The method of claim 1, further comprising:
receiving contextual information about the household at a home energy manager that is operatively coupled to the at least two appliances; and
determining a local energy schedule for using renewable energy sources and/or storage batteries within the household, wherein the local energy schedule is based, at least in part, on the contextual information received at the home energy manager related to demand response of a utility.

7. The method of claim 1, further comprising:
monitoring ongoing appliance use to infer compliance with the appliance use schedules; and
dynamically modifying the appliance use schedules according to monitored contextual information and the user's evolving energy use behavior.

8. The method of claim 7, further comprising one or more of:
displaying via the user interface energy saving opportunities in compliance with the user's evolving energy use behavior;
recommending use of a renewable energy source and/or a stored energy source within the household; and
displaying incentive or motivational information to the user based the user's evolving energy use behavior.

9. The method of claim 1, further comprising:
receiving contextual information about the household at a home energy manager that is operatively coupled to the at least two appliances; and
correlating the contextual information received at the home energy manager with energy consumption levels to dynamically change the appliance use schedule for at least one of the appliances based, at least in part, on an energy-saving condition and the accepted user preferences.

10. The method of claim 1, further comprising coordinating a home energy manager to perform at least one of the following operations:
gathering contextual information related to environmental conditions;
gathering energy supply related conditions; and
gathering energy cost conditions.

11. The method of claim 1, further comprising:
monitoring household's occupant activity levels and use of the at least two appliances; and
determining the appliance use schedule for at least one of the appliances based, at least in part, the household's occupant activity levels and the use of one or more of the appliances.

12. The method of claim 1, further comprising operating each of the two or more appliances according to the corresponding appliance use schedule.

13. A system for dynamically scheduling household energy use, wherein the household includes at least two appliances including a dishwasher, the system comprising:
a user interface;
a memory; and
one or more processors coupled to the user interface and the memory, the one or more processors configured to:
present a user with an interview screen about a user's preferences for each of the at least two appliances via the user interface by presenting a question asking whether to delay a heat-dry operation of dishwasher until an off-peak time;
present the user with one or more selectable responses corresponding to the interview screens;
accept a selected response as an indication of the user's preferences for each of the at least two appliances via the user interface;
determine an appliance use schedule for each of the at least two appliances based, at least in part, on the accepted user preferences;
monitor ongoing appliance use to infer compliance with the appliance use schedules; and
dynamically modify the appliance use schedules according to the user's evolving energy use behavior by delaying the heat-dry operation of the dishwasher based on an answer to the question asking whether to delay the heat-dry operation of the dishwasher until the off-peak time.

14. The system of claim 13,
wherein the one or more processors are configured to receive contextual information about the household, and
where the contextual information includes at least one of the following:
current weather information;
forecast weather information;
security system information;
utility information;
renewable energy-use information;
energy storage information;
energy supply type; and
utility signals including at least one of the following types of signals: demand response (DR), real-time-pricing (RTP) information, time-of-use (TOU) tariff.

15. An apparatus comprising one or more processor readable storage devices having processor readable code stored thereon in a non-transient state for execution by a processor, the processor readable code causing the processor to execute a method of dynamically scheduling household energy use for a household comprising:

querying a user about a user's preferences for each of at least two appliances of the household by providing one or more interview questions and one or more selectable predefined answers, wherein the at least two appliances include a dishwasher, and wherein the one or more interview questions include a question asking whether to delay a heat-dry operation of the dishwasher until an off-peak time;

accepting an indication of the user's preferences for each of the at least two appliances;

determining an appliance use schedule for each of the at least two appliances based, at least in part, on the accepted user preferences;

monitoring ongoing appliance use to infer compliance with the appliance use schedules; and     dynamically modifying the appliance use schedules according the user's evolving energy use behavior by delaying the heat-dry operation of the dishwasher based on an answer to the question asking whether to delay the heat-dry operation of the dishwasher until the off-peak time.

16. The apparatus of claim 15,
wherein the processor readable code is configured to be executable by the processor for further causing the processor to receive contextual information about the household, and
where the contextual information includes at least one of the following:
    current weather information;
    forecast weather information;
    security system information;
    utility information;
    renewable energy-use information;
    energy storage information;
    energy supply type; and
    utility signals including at least one of the following types of signals: demand response (DR), real-time-pricing (RTP) information, time-of-use (TOU) tariff.

17. The method of claim 1, wherein the one or more interview questions include a question asking whether to run the heat-dry operation of the dishwasher.

18. The method of claim 1,
wherein delaying the heat-dry operation comprises delaying, in a first instance, the heat-dry operation of the dishwasher based on an answer to the question asking whether to delay the heat-dry operation of the dishwasher until the off-peak time,
further comprising refraining from delaying, in a second instance, the heat-dry operation of the dishwasher based on the answer to the question asking whether to delay the heat-dry operation of the dishwasher until the off-peak time.

19. The system of claim 13,
wherein the one or more processors are configured to delay the heat-dry operation by delaying, in a first instance, the heat-dry operation of the dishwasher based on an answer to the question asking whether to delay the heat-dry operation of the dishwasher until the off-peak time,
wherein the one or more processors are also configured to refrain from delaying, in a second instance, the heat-dry operation of the dishwasher based on the answer to the question asking whether to delay the heat-dry operation of the dishwasher until the off-peak time.

20. The method of claim 1, further comprising:
receiving contextual information about the household at a home energy manager that is operatively coupled to the at least two appliances including a dishwasher; and
identifying a comfort of service model, wherein the comfort of service model references the received contextual information as well as the indication of the user's preferences for each of the at least two appliances,
wherein determining the appliance use schedule for each of the at least two appliances is further based on the comfort of service model and the received contextual information.

* * * * *